United States Patent
Ruppert et al.

(10) Patent No.: US 11,185,880 B2
(45) Date of Patent: *Nov. 30, 2021

(54) SKID-MOUNTED MOVABLE BOOM CRADLES FOR AN AGRICULTURAL PRODUCT SPRAYER

(71) Applicant: CNH Industrial America LLC, New Holland, PA (US)

(72) Inventors: Rex L. Ruppert, Benson, MN (US); John P. Honermann, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 304 days.

This patent is subject to a terminal disclaimer.

(21) Appl. No.: 15/799,170

(22) Filed: Oct. 31, 2017

(65) Prior Publication Data

US 2019/0126309 A1   May 2, 2019

(51) Int. Cl.
| | |
|---|---|
| *B05B 1/20* | (2006.01) |
| *B05B 15/62* | (2018.01) |
| *B05B 9/00* | (2006.01) |
| *A01B 63/00* | (2006.01) |
| *B05B 12/00* | (2018.01) |
| *B05B 15/656* | (2018.01) |
| *A01M 7/00* | (2006.01) |
| *A01B 63/02* | (2006.01) |

(52) U.S. Cl.
CPC ............ *B05B 15/62* (2018.02); *A01B 63/004* (2013.01); *A01M 7/0053* (2013.01); *B05B 1/20* (2013.01); *B05B 9/007* (2013.01); *B05B 12/002* (2013.01); *B05B 15/656* (2018.02); *A01B 63/023* (2013.01)

(58) Field of Classification Search
CPC .. A01M 7/0053; A01B 63/004; A01B 63/023; B05B 15/62; B05B 15/656; B05B 1/20; B05B 9/007; B05B 12/002
USPC ......................................................... 239/168
See application file for complete search history.

(56) References Cited

U.S. PATENT DOCUMENTS

| | | | | |
|---|---|---|---|---|
| 3,556,404 | A | * | 1/1971 | Walker ................ A01M 7/0075 239/167 |
| 3,887,132 | A | * | 6/1975 | Widmer .................. A01M 7/00 239/166 |
| 4,394,968 | A | | 7/1983 | Tyler |
| 4,595,140 | A | | 6/1986 | Harden et al. |
| (Continued) | | | | |

*Primary Examiner* — Chee-Chong Lee
(74) *Attorney, Agent, or Firm* — Rebecca L. Henkel; Rickard K. DeMille

(57) ABSTRACT

An apparatus and method are provided for removably mounting an agricultural product sprayer, having at least one foldable boom, on an agricultural product applicator having a chassis adapted for removably receiving the agricultural product sprayer, by attaching the foldable boom to a skid adapted for operative, removable mounting on the applicator chassis. The skid further has a boom cradle adapted for supporting the foldable boom in a folded position when the skid is mounted on the chassis, and when the skid is separated from the chassis of the agricultural applicator. The boom cradle is selectively movable between an inboard and an outboard position of the cradle to facilitate operation of the product applicator, and also to facilitate mounting the sprayer on, and removing the sprayer from the chassis of the applicator.

18 Claims, 5 Drawing Sheets

(56) References Cited

U.S. PATENT DOCUMENTS

| | | | |
|---|---|---|---|
| 4,673,130 A * | 6/1987 | Simpson | A01M 7/0075 239/167 |
| 4,728,249 A | 3/1988 | Gano | |
| 5,435,854 A | 7/1995 | Derlein | |
| 5,542,812 A | 8/1996 | Grove et al. | |
| 5,954,270 A * | 9/1999 | Rosset | A01M 7/0075 239/159 |
| 6,012,648 A | 1/2000 | Morris | |
| 6,450,379 B1 | 9/2002 | Cook | |
| 6,626,375 B1 * | 9/2003 | Ireland | B64D 1/18 169/53 |
| 7,021,675 B2 * | 4/2006 | Lawson | E21C 45/00 285/275 |
| 7,036,606 B2 | 5/2006 | Rossi | |
| 7,364,095 B2 | 4/2008 | Sosnowski et al. | |
| 7,784,714 B2 | 8/2010 | Honermann et al. | |
| 8,091,799 B2 | 1/2012 | Honermann et al. | |
| 9,033,640 B2 | 5/2015 | Parker et al. | |
| 9,057,179 B1 | 6/2015 | Kubas | |
| 2006/0011741 A1 * | 1/2006 | Hahn | A01M 7/0064 239/172 |
| 2006/0045715 A1 * | 3/2006 | Honermann | A01M 7/005 414/723 |
| 2010/0001029 A1 | 1/2010 | Tai | |
| 2012/0043396 A1 * | 2/2012 | Joris | A01M 7/0053 239/164 |
| 2016/0221032 A1 * | 8/2016 | Whiting | B05B 5/08 |

* cited by examiner

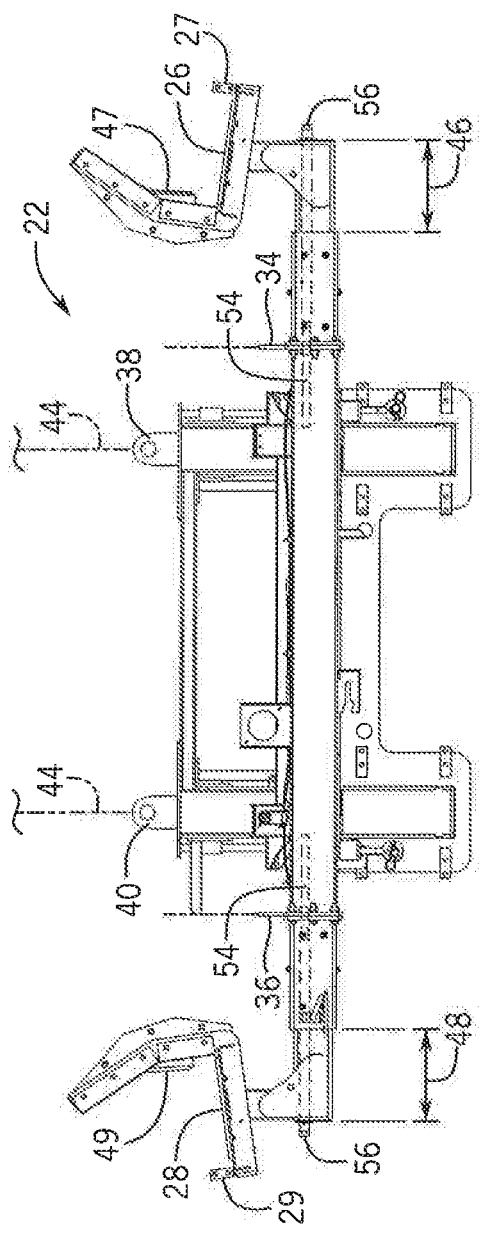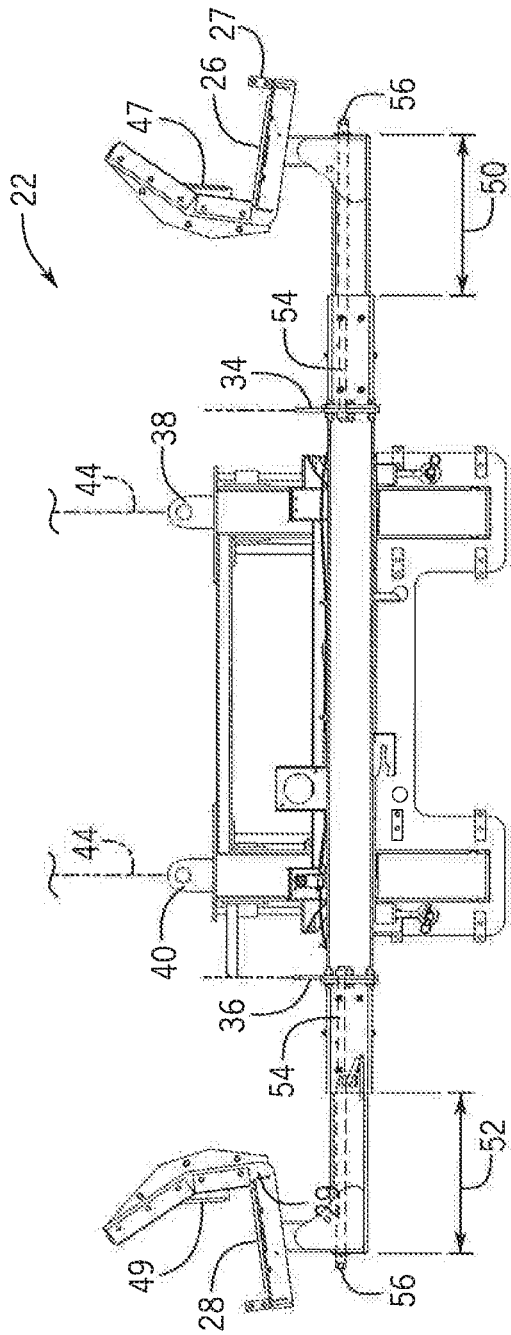

SKID-MOUNTED MOVABLE BOOM CRADLES FOR AN AGRICULTURAL PRODUCT SPRAYER

FIELD OF THE INVENTION

This invention generally relates to agricultural product applicators, and more particularly to removably mounting an agricultural product sprayer, having one or more foldable booms, on the chassis of an agricultural product applicator.

BACKGROUND OF THE INVENTION

Modern agricultural practices rely heavily on timely application of agricultural products such as fertilizers and chemicals. Some of these products are applied in dry form using dry product spreading equipment, and others are applied in liquid form using sprayers.

It is advantageous to mount the dry and liquid product application equipment on separate skids, that can be interchangeably mounted on the same product applicator. Such skid-mounted equipment is typically large in size and heavy, weighing as much as several thousand pounds. Lifting the skid-mounted equipment into place typically requires the use of some sort of lifting arrangement, Liquid product application sprayer equipment typically includes foldable booms that may span 140 feet, or more, when extended. These booms are usually placed in their folded position during installation and removal of the skid mounted sprayer.

Prior skid-mounted sprayer equipment has not included provisions on the skid for securing the foldable booms during installation, removal, and off-machine storage of the skid mounted sprayer equipment. This has required the use of additional securing straps or snubbers, to hold the folded booms in a safe and desirable position during installation, removal, and off-machine storage. The necessity for such additional equipment makes the processes of installation, removal and storage of the sprayer increases the time and effort that is required to install and remove of the sprayer.

It is desirable, therefore, to have an improved method and apparatus for supporting the folded booms during the installation and removal process, and during off-machine storage of the sprayer. It is also desirable that such improved boom support methods and apparatuses be usable for supporting the folded booms when the sprayer equipment is mounted on the applicator. It is further desirable, in some instances, that such improved boom support methods and apparatuses include provisions for locking the folded booms in place to facilitate operation of the applicator and installation and removal of the sprayer.

BRIEF SUMMARY OF THE INVENTION

The invention provides an apparatus and method for removably mounting an agricultural product sprayer, having at least one foldable boom, on an agricultural product applicator having a chassis adapted for removably receiving the agricultural product sprayer, by attaching the foldable boom to a skid adapted for operative, removable mounting on the applicator chassis. The skid further has a movable boom cradle adapted for supporting the foldable boom in a folded position when the skid is mounted on the chassis, and when the skid is separated from the chassis of the agricultural applicator. The boom cradle is selectively movable between an inboard and an outboard position of the cradle to facilitate operation of the product applicator, and also to facilitate mounting the sprayer on, and removing the sprayer from the chassis of the applicator. As a result of this configuration, operation of the applicator, and installation and removal of the sprayer are facilitated.

To facilitate moving the boom cradle, some forms of the invention may include at least one actuator operatively attached for moving the boom cradle between the inboard and outboard positions In some forms of the invention, the skid may include lifting apparatus attachment elements, adapted for attachment of a lifting apparatus for mounting the sprayer on, and removing the sprayer from the chassis. Some forms of the invention may further include a boom catch, latch and/or lock for securing the folded boom in the boom cradle.

A movable boom cradle, according to the invention, may be configured and disposed adjacent to one of the lifting apparatus attachment elements in such a manner that the outboard position of the boom cradle provides greater clearance to facilitate mounting the sprayer on, and removing the sprayer from the chassis of the applicator. Balance of the sprayer may also be improved with the boom cradle in its outboard position, when the skid is suspended by the lifting apparatus. In some forms of the invention, having greater clearance between the boom cradle and the adjacent lifting apparatus attachment element may also facilitate attachment of the lifting apparatus to the lifting apparatus attachment element.

The skid may define a longitudinal axis of the skid and a first end of the skid disposed along the longitudinal axis of the skid and adapted for attachment to the first end of the foldable boom. The boom cradle may be disposed at an opposite longitudinal end of the skid.

In some forms of the invention, the first end of the skid is a rear end of the skid, and the opposite end of the skid is a front end of the skid when the sprayer is mounted on the chassis of the applicator.

In some forms of the invention, where the sprayer further includes left and right foldable booms, the skid may include left and right boom cradles adapted for respectively supporting the left and right foldable booms in their folded positions when the skid is mounted on the chassis and when the skid is separated from the chassis of the agricultural applicator. The movable boom cradles may include at least one actuator operatively attached for moving the boom cradles between their respective inboard and outboard positions. The skid may include left and right lifting apparatus attachment elements disposed respectively adjacent to each of the left and right movable boom cradles, with the adjacent lifting apparatus attachment elements each being adapted for attachment of the lifting apparatus for mounting the sprayer on, and removing the sprayer from the chassis. The movable boom cradles may be respectively configured and disposed in such a manner that the outboard positions of the left and right boom cradles provide increased distance between the left and right booms resting in the cradles, to thereby facilitate installation of the sprayer on and removal of the sprayer from the bed of the applicator.

In one form of the invention, an agricultural product sprayer is provided for an agricultural product applicator having a chassis adapted for removably receiving the agricultural product sprayer. The agricultural product sprayer includes a skid, according to the invention, adapted for operative removable connection to the applicator chassis, and further adapted for attachment to the skid of a foldable boom of the sprayer. The skid includes a boom cradle, according to the invention, adapted for supporting the foldable boom in a folded position when the skid is mounted on the chassis, and when the skid is separated from the chassis of the agricultural applicator. The boom cradle may be configured and disposed to be selectively movable between inboard and outboard positions of the boom cradle.

The invention may also take the form of an agricultural applicator having a chassis including a bed adapted for removable mounting on the bed of an agricultural product sprayer having at least one foldable boom. The agricultural product sprayer includes a skid, according to the invention, adapted for operative removable connection to the applicator chassis, and further adapted for attachment to the skid of the foldable booms. The skid may include a boom cradle, according to the invention, adapted for supporting the foldable boom in a folded position when the skid is mounted on the chassis, and when the skid is separated from the chassis of the agricultural applicator. The boom cradle may be configured and disposed to be selectively movable between inboard and outboard positions of the boom cradle.

A method, according to the invention, may include attaching the foldable boom of an agricultural product sprayer to a skid that is adapted for operative removable mounting on a chassis of an agricultural product applicator, with the skid including a boom cradle adapted for supporting the foldable boom in a folded position when the skid is mounted on the chassis, and when the skid is separated from the chassis of the agricultural applicator, with the boom cradle being selectively movable between inboard and outboard positions. The method may include positioning the movable boom cradle to facilitate mounting of the skid on and removal of the skid from the applicator chassis. The method may also include supporting the foldable boom in the boom cradle during mounting of the skid on, and removal of the skid from the applicator chassis.

In forms of the invention where the skid includes lifting apparatus attachment elements, adapted for attachment of a lifting apparatus for mounting the sprayer on, and removing the sprayer from the chassis, a method may further include moving the movable cradle toward its outboard position to facilitate mounting the sprayer on, and removing the sprayer from the chassis of the applicator.

A method, according to the invention may further include attaching a lifting apparatus to the attachments of the skid for mounting the sprayer on and removing the sprayer from the chassis. A method, according to the invention, may also include locking the folded boom to the boom to the boom cradle with a boom lock.

Other aspects, objects and advantages of the invention will be apparent from the following detailed description and drawings of exemplary embodiments of the invention.

BRIEF DESCRIPTION OF THE DRAWINGS

The accompanying drawings incorporated in and forming a part of the specification illustrate several aspects of the present invention and, together with the description, explain the invention. In the drawings:

FIG. 4 is a front, partially cut-away, orthographic view showing the boom cradles of the exemplary embodiment of the skid of FIG. 3 positioned in inboard positions of the cradles;

FIG. 5 is a front, partially cut-away, orthographic view showing the boom cradles of the exemplary embodiment of the skid of FIG. 3 positioned in outboard positions of the cradles.

While the invention is described in connection with certain exemplary embodiments, there is no intent to limit it to those embodiments. On the contrary, the intent is to cover all alternatives, modifications and equivalents within the spirit and scope of the invention.

DETAILED DESCRIPTION OF EXEMPLARY EMBODIMENTS

Figure 1:
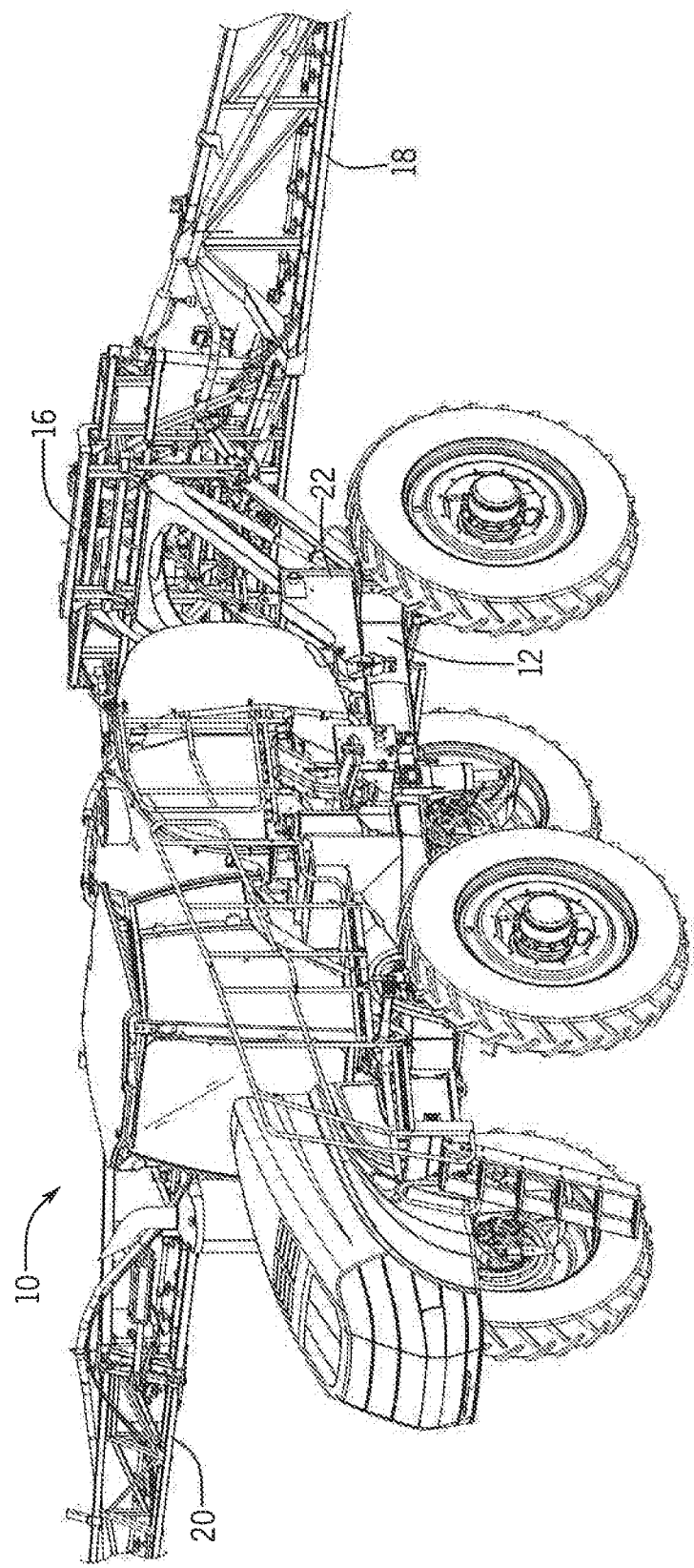
FIG. 1 is an isometric illustration of an exemplary embodiment of the invention in the form of an agricultural product applicator carrying a sprayer with foldable booms mounted on a removable skid having movable boom cradles attached to the skid for supporting the booms in their folded position.

FIG. 1 shows an exemplary embodiment of the invention in the form of an agricultural applicator 10 having a chassis 12 including a bed 14 (see FIG. 2) that is adapted for removable mounting on the bed 14 of an agricultural product sprayer 16 having left and right foldable booms 18,20. The agricultural product sprayer 16 includes a skid 22, according to the invention, that is adapted for operative removable connection to the applicator chassis 12. The rear end 24 (see FIG. 3) of the skid 22 is adapted for operative attachment of the left and right foldable booms 18,20 to the skid 22.

Figure 2:
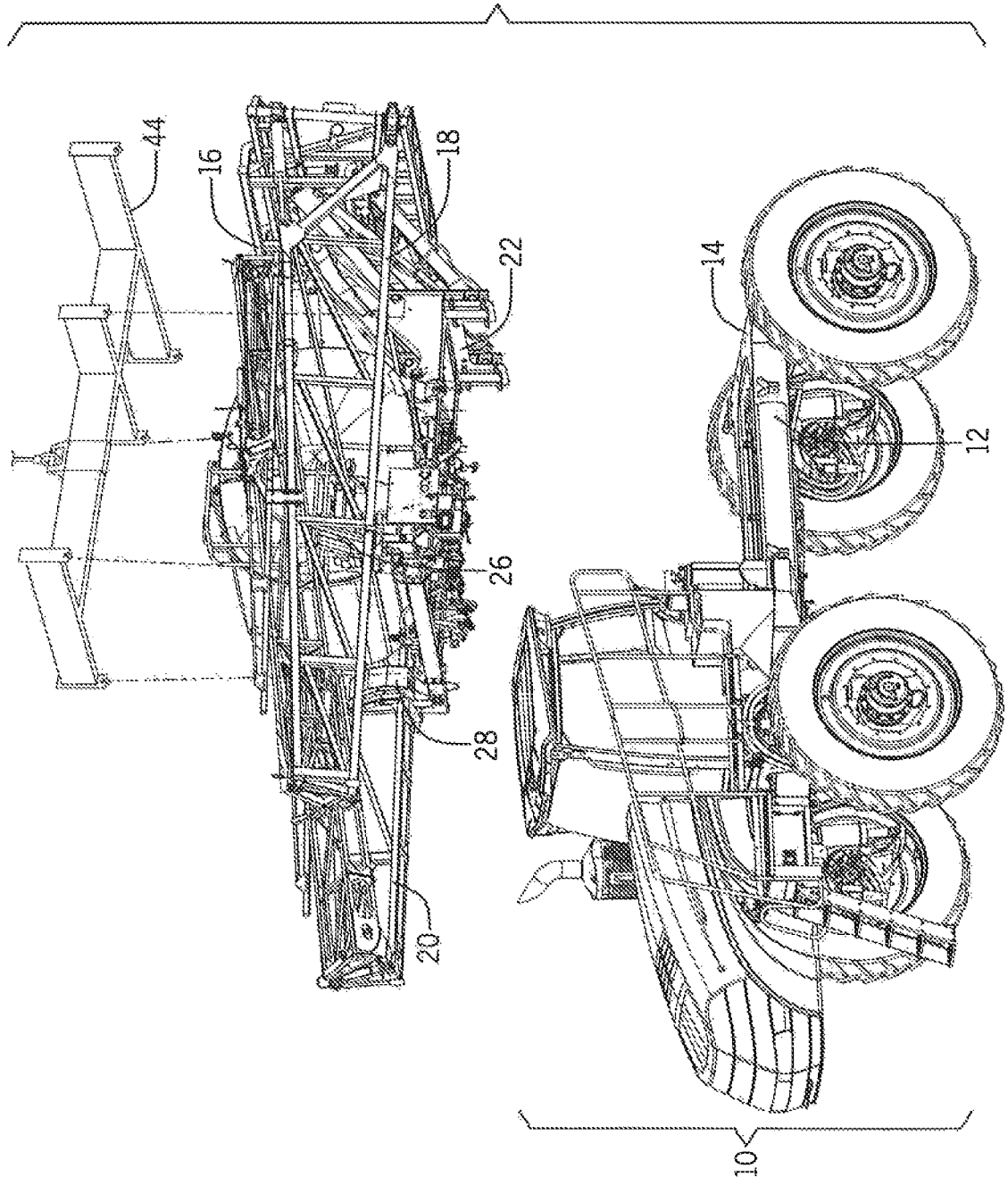
FIG. 2 is an isometric illustration showing the sprayer being lifted off of a chassis of the applicator of FIG. 1, using a lifting apparatus, while the folded booms are supported in the boom cradles attached to the skid.
Figure 3:
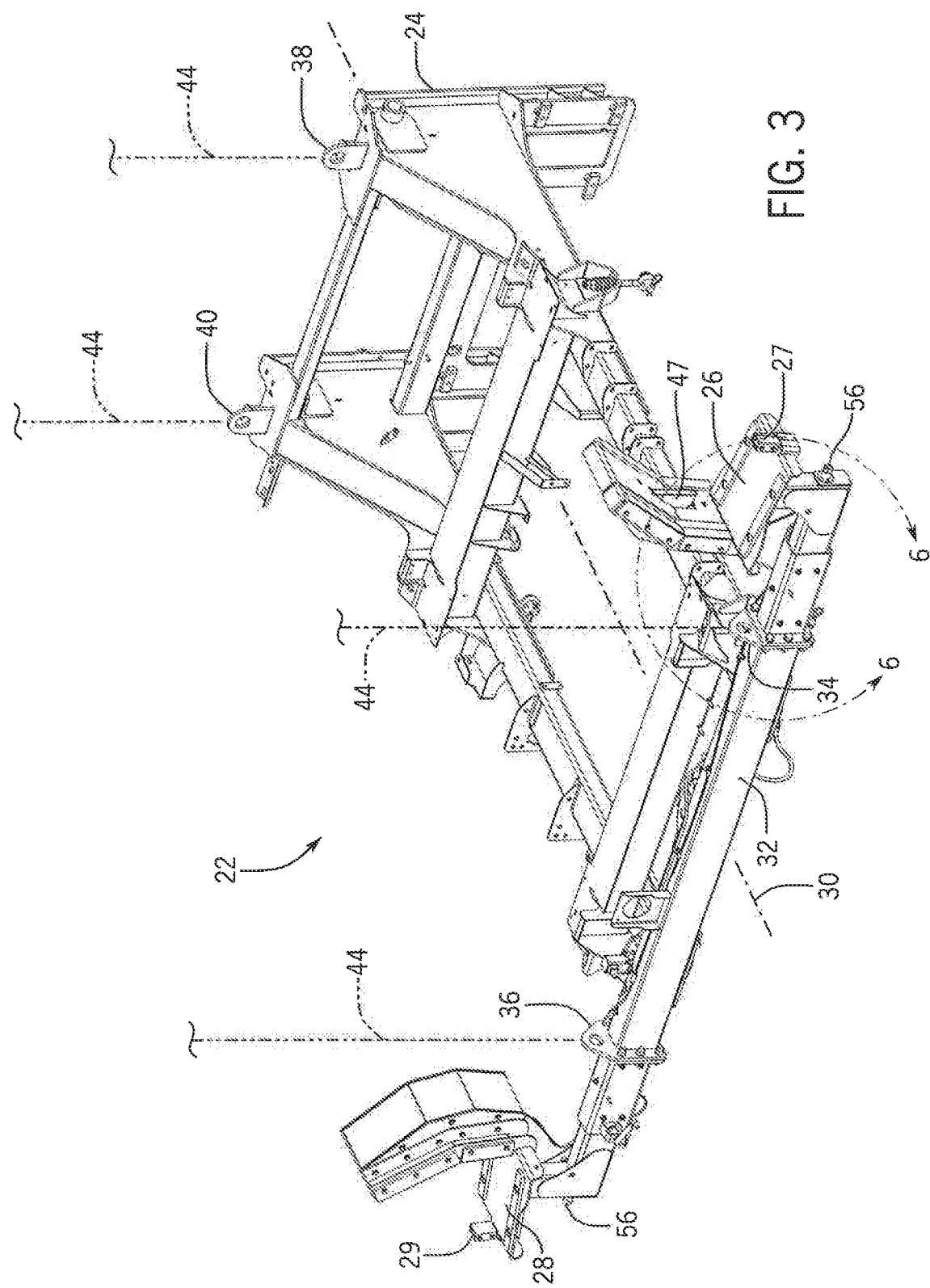
FIG. 3 is an isometric illustration of the skid of the exemplary embodiments of the applicator and sprayer of FIGS. 1 and 2.

As shown in FIGS. 2 and 3, the skid 22 includes left and right boom cradles 26,28 that are adapted for supporting the left and right foldable booms 18,20 in their folded positions when the skid 22 is mounted on the chassis 12, and also when the skid 22 is separated from the chassis 22 of the agricultural applicator 10.

As shown in FIG. 3, the skid 22 defines a longitudinal axis 30 of the skid 22 and a first end 24 of the skid 22 disposed along the longitudinal axis 30 of the skid 22. The first end 24 is adapted for operative attachment of proximal, first ends of the foldable booms 18,20. The boom cradles 26,28 are located at an opposite longitudinal end 32 of the skid 22, and are adapted for receiving and supporting the distal ends of the folded booms 18,20.

In the exemplary embodiment of the applicator 10 and sprayer 16, the first end 24 of the skid 22 is the rear end 24 of the skid 22, and the opposite end 32 of the skid 22 is the front end 32 of the skid 22 when the sprayer 16 is mounted on the chassis 12 of the applicator 10. It will be understood, however, that in other embodiments of the invention the proximal ends of the booms 18,20 may be mounted to the front end 32 of the skid 22, and the boom cradles 26,28 may be positioned at a rear end 24 of the skid 22.

It will also be appreciated that, in the exemplary embodiment of the applicator 10 and sprayer 16, the skid 22 and its attached boom cradles 26,28 are adapted for respectively supporting the left and right foldable booms 18,20 in their folded positions when the skid 22 is mounted on the chassis 12. In addition, because the boom cradles 26,28 are part of the skid 22, they also provide support for the folded booms 18,20 while the sprayer 16 is being lifted off of, or on to the chassis 12 of the applicator 10, as shown in FIG. 2, and also when the sprayer 16 is separated from the chassis 12 of the agricultural applicator 10.

As shown in FIGS. 3-6, the boom cradles 26,28 each include a boom latch or catch, in the form of posts 27,29, for securing the folded booms 18,20 in the cradles 26,28, by precluding the folded booms 18,20 from sliding out of the cradles 26,28.

As further shown in FIGS. 3-6, the left and right boom cradles 26,28 of the exemplary embodiment of the skid 22, sprayer 16, and applicator 10 also respectively include left and right boom locking arrangements 47,49, for locking the folded left and right booms 18,20 into their respective left and right cradles 26,28. (Note: only the left boom locking arrangement is visible in FIGS. 3 and 6. In various forms of the invention, these latches 27,29 or locks 47,49 may be active or passive, and configured to be utilized or actuated in any appropriate manner, such as manually or mechanically, remotely or at the boom cradles 26,28.

As shown in FIGS. 2 and 3, the exemplary embodiment of skid 22 includes lifting apparatus attachment elements, in the form of four lifting eyes 34,36,38,40 that are adapted for attachment of a lifting apparatus 44 for mounting the sprayer 16 on, and removing the sprayer 16 from the chassis 12. The invention may also be practiced with any other appropriate lifting provisions.

As shown in FIGS. 4 and 5, the left and right boom cradles 26,28, of the exemplary embodiments of the skid 22, sprayer 16 and applicator 10, are selectively movable between respective inboard positions 46,48, as shown in FIG.4, and respective outboard positions 50,52, as shown in FIG. 5.

As further illustrated in FIGS. 4 and 5, the front left and front right lifting apparatus attachment elements 34,36 of the skid 22 are disposed respectively adjacent to, and inboard from each of the left and right movable boom cradles 26,28.

By virtue of this arrangement, it will be appreciated that the movable boom cradles 26,28 are respectively configured and disposed such that the outboard positions 50 of the left boom cradle 26 provides greater clearance between the left boom cradle 26 and the adjacent left lifting apparatus attachment element 34. Similarly, the outboard position 52 of the right boom cradle 28 provides greater clearance between the right boom cradle 28 and the adjacent right lifting apparatus attachment element 36. Positioning one or both of the boom cradles 26,28 toward its respective outboard position may facilitate installation and removal of the sprayer 16 by allowing more clearance for the skid 22 and booms 18,20 to swing to some extent during installation of the sprayer 16 on, and removal of the sprayer 16 from the bed 14 of the applicator 10, without striking features such as the chassis 12, handrails, cab or exhaust, of the applicator 10. In some embodiments of the invention, moving the boom cradles 26,28 toward their respective outboard positions may also facilitate attachment and/or removal of the lifting apparatus 44, and improve balance of the skid 22 and its contents while it is suspended from the lifting apparatus 44.

Once the sprayer 16 is mounted on the chassis 12 of the applicator 10, the boom cradles 26,28 may be moved to their respective inboard positions 46,48, to thereby facilitate operation of the applicator 10 by narrowing its overall width of the sprayer 16 when the booms 18,20 are in their folded positions and supported in the boom cradles 26,28.

Figure 6:
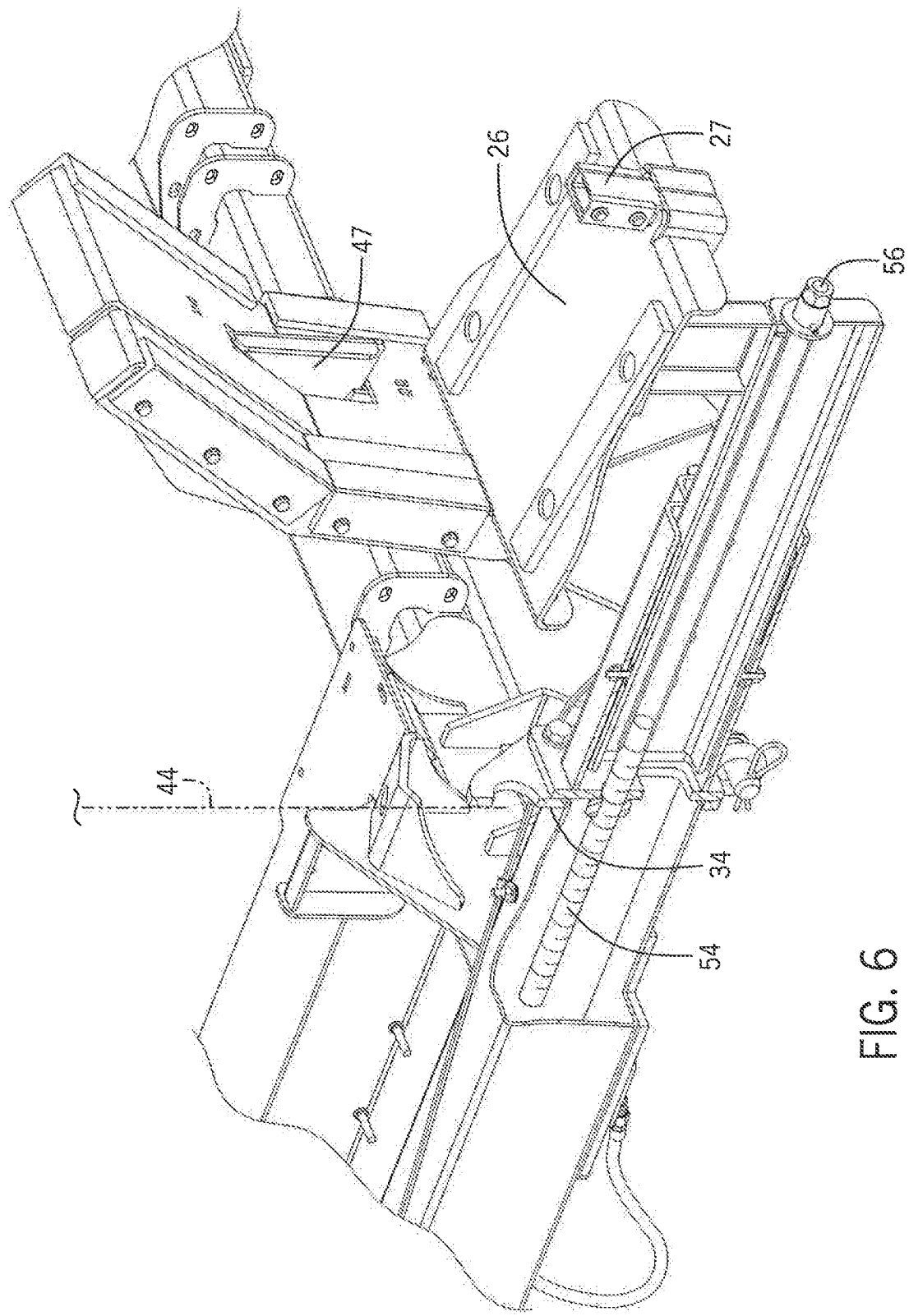
FIG. 6 is a partially cut-away view of a left movable boom cradle of the skid of FIG. 3 showing a screw-type actuator for moving the boom cradle with respect to the rest of the skid.

As illustrated in FIGS. 4-6, both the left and right movable boom cradles 26,28 include a manually operated, screw-type linear actuator 54 that is operatively connected for moving either the left or right boom cradle 26,28, respectively, between its inboard and outboard positions 46,50; 48,52. The screw-type actuators 54 of the exemplary embodiment each include an external drive connector 56 that is configured to be turned by a manual wrench, or a powered impact wrench to drive the actuator 54 for positioning the movable boom cradles 26,28. It will be understood that, in other embodiments of the invention, other types of manual and automated actuators may be utilized with efficacy. It will also be understood that, although the exemplary embodiments described herein use separate actuators for moving the left and right boom cradles, in other embodiments of the invention a single, common actuator may be operatively connected to move multiple, skid-mounted, movable boom cradles.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not to,") unless otherwise noted. Recitation of ranges of values herein are merely intended to serve as a shorthand method of referring individually to each separate value failing within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An agricultural product sprayer being connectable to an agricultural product applicator having a chassis adapted for removably receiving the agricultural product sprayer thereon, the agricultural product sprayer comprising:
  a left foldable boom and a right foldable boom, the left and right foldable booms being foldable to folded positions;
  a skid adapted for operative removable connection to the chassis and for supporting the left foldable boom and the right foldable boom, the skid including:
    a left boom cradle and a right boom cradle selectively movable between inboard and outboard positions, the left and right boom cradles adapted for supporting the left and right foldable booms in their folded positions when the skid is mounted on the chassis and when the skid is separated from the chassis of the agricultural product applicator; and a left lifting hook and a right lifting hook interconnected to the skid, the left and right lifting hooks disposed respectively adjacent to the left and right boom cradles, the left and right lifting hooks each adapted for facilitating mounting the agricultural product sprayer on, and removing the agricultural product sprayer from, the chassis, wherein the boom cradle is selectively linearly movable between inboard and outboard positions thereof, and wherein the left and right boom cradles are respectively configured and disposed in such a manner that the outboard positions of the left and right boom cradles provide a distance between the left and right foldable booms supported by the left and right boom cradles, to thereby facilitate installation of the agricultural product sprayer on and removal of the agricultural product sprayer from the agricultural product applicator.

2. The agricultural product sprayer of claim 1, wherein the left boom cradle includes an actuator operatively attached for moving the left boom cradle between the inboard and outboard positions thereof.

3. The agricultural product sprayer of claim 2, wherein the right boom cradle includes an actuator operatively attached for moving the right boom cradle between the inboard and outboard positions thereof.

4. The agricultural product sprayer of claim 1, further comprising a left boom lock for securing the left foldable boom in the left boom cradle.

5. The agricultural product sprayer of claim 4, further comprising a right boom lock for securing the right foldable boom in the right boom cradle.

6. The agricultural product sprayer of claim 1, wherein:
the left boom cradle is configured and disposed adjacent to the left lifting hook in the outboard position so as to provide clearance between the left foldable boom and the agricultural product applicator when the left foldable boom is supported in the left boom cradle in the folded position, during mounting the agricultural product sprayer on, and removing the agricultural product sprayer from, the chassis of the agricultural product applicator.

7. The agricultural product sprayer of claim 6, wherein:
the right boom cradle is configured and disposed adjacent to the right lifting hook in the outboard position so as to provide clearance between the right foldable boom and the agricultural product applicator when the right foldable boom is supported in right left boom cradle in the folded position, during mounting the agricultural product sprayer on, and removing the agricultural product sprayer from, the chassis of the agricultural product applicator.

8. The agricultural product sprayer of claim 1, wherein:
the skid has a longitudinal axis and a first end of the skid is disposed along the longitudinal axis of the skid and adapted for attachment thereto of the left foldable boom and the right foldable book; and
the left boom cradle and the right boom cradle are disposed at an opposite longitudinal end of the skid.

9. The agricultural product sprayer of claim 8, wherein the first end of the skid is a rear end of the skid, and the opposite longitudinal end of the skid is a front end of the skid when the agricultural product sprayer is mounted on the chassis of the agricultural product applicator.

10. An agricultural product applicator comprising:
a chassis including a bed;

an agricultural product sprayer removably receivable on the bed of the chassis, the agricultural product sprayer comprising a left foldable boom and a right foldable boom, the left and right foldable booms being foldable to folded positions;

a skid adapted for operative removable connection to the chassis and for supporting the left foldable boom and the right foldable boom, the skid including:

a left boom cradle and a right boom cradle selectively movable between inboard and outboard positions, the left and right boom cradles adapted for supporting the left and right foldable booms in their folded positions when the skid is mounted on the chassis, and when the skid is separated from the chassis of the agricultural product applicator; and a left lifting hook and a right lifting hook interconnected to the skid, the left and right lifting hooks disposed respectively adjacent to the left and right boom cradles, the left and right lifting hooks each adapted for facilitating mounting the agricultural product sprayer on, and removing the agricultural product sprayer from, the chassis, wherein the boom cradle is selectively linearly movable between inboard and outboard positions thereof, and wherein the left and right boom cradles are respectively configured and disposed in such a manner that the outboard positions of the left and right boom cradles provide a distance between the left and right foldable booms supported by the left and right boom cradles, to thereby facilitate installation of the agricultural product sprayer on and removal of the agricultural product sprayer from the agricultural product applicator.

11. The agricultural product applicator of claim 10, wherein the left boom cradle includes an actuator operatively attached for moving the left boom cradle between the inboard and outboard positions thereof.

12. The agricultural product applicator of claim 11, wherein the right boom cradle includes an actuator operatively attached for moving the right boom cradle between the inboard and outboard positions thereof.

13. The agricultural product applicator of claim 10, further comprising a left boom lock for securing the left foldable boom in the boom cradle.

14. The agricultural product applicator of claim 13, further comprising a right boom lock for securing the right foldable boom in the right boom cradle.

15. The agricultural product applicator of claim 10, wherein:
the left boom cradle is configured and disposed adjacent to the left lifting hook in the outboard position so as to provide a clearance between the left foldable boom and the chassis of the agricultural product applicator when the left foldable boom is supported in the left boom cradle in the folded position, during mounting the agricultural product sprayer on, and removing the agricultural product sprayer from, the chassis of the agricultural product applicator.

16. The agricultural product applicator of claim 15, wherein:
the right boom cradle is configured and disposed adjacent to the right lifting hook in the outboard position so as to provide clearance between the right foldable boom and the chassis of the agricultural product applicator when the right foldable boom is supported in right left boom cradle in the folded position, during mounting the agricultural product sprayer on, and removing the agricultural product sprayer from, the chassis of the agricultural product applicator.

17. The agricultural product applicator of claim 10, wherein:
- the skid has a longitudinal axis and a first end of the skid disposed along the longitudinal axis of the skid and adapted for attachment thereto of the left foldable boom and the right foldable book; and
- the left boom cradle and the right book cradle are disposed at an opposite longitudinal end of the skid.

18. The agricultural product applicator of claim 17, wherein the first end of the skid is a rear end of the skid, and the opposite longitudinal end of the skid is a front end of the skid when the agricultural product sprayer is mounted on the chassis of the agricultural product applicator.

* * * * *